UNITED STATES PATENT OFFICE.

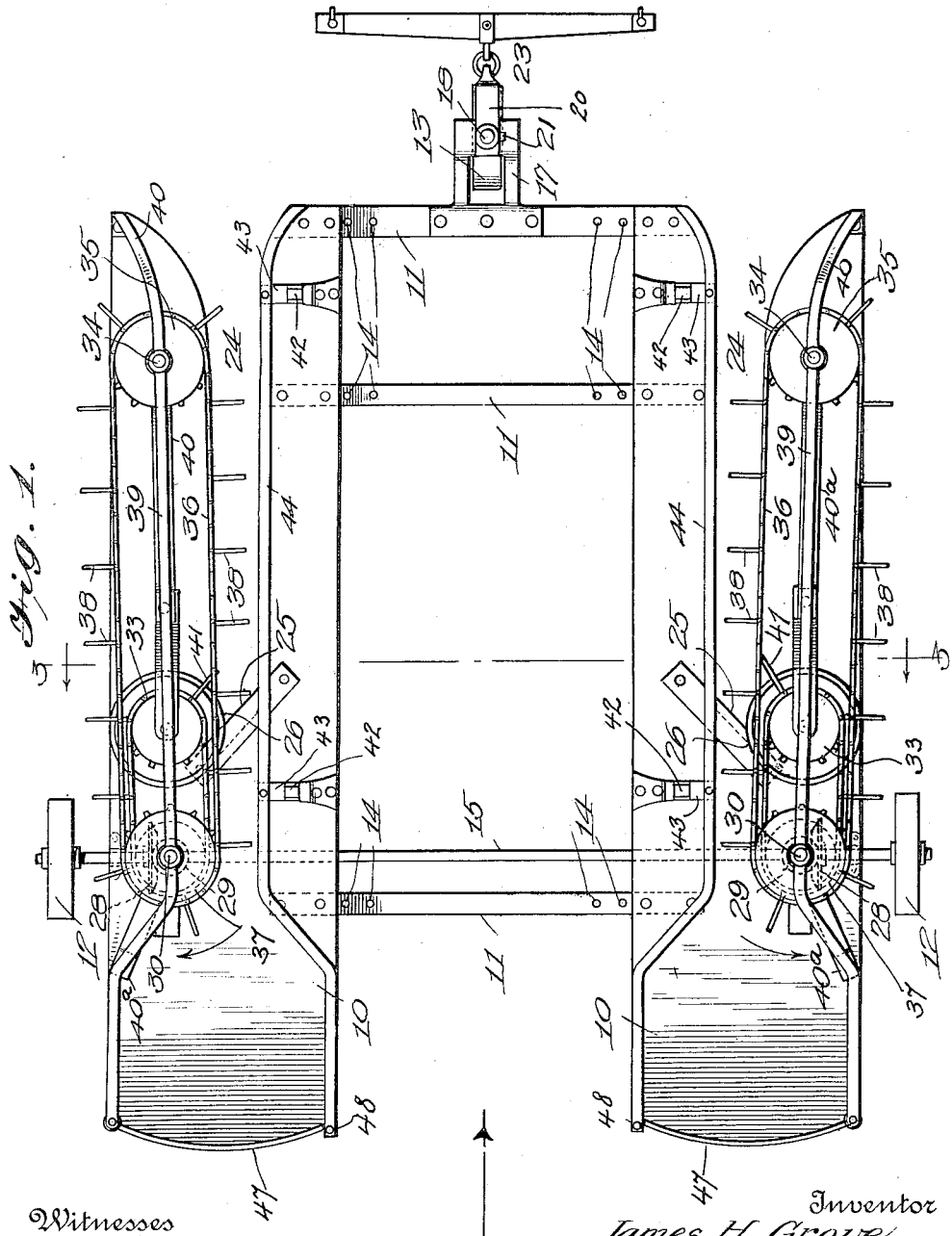

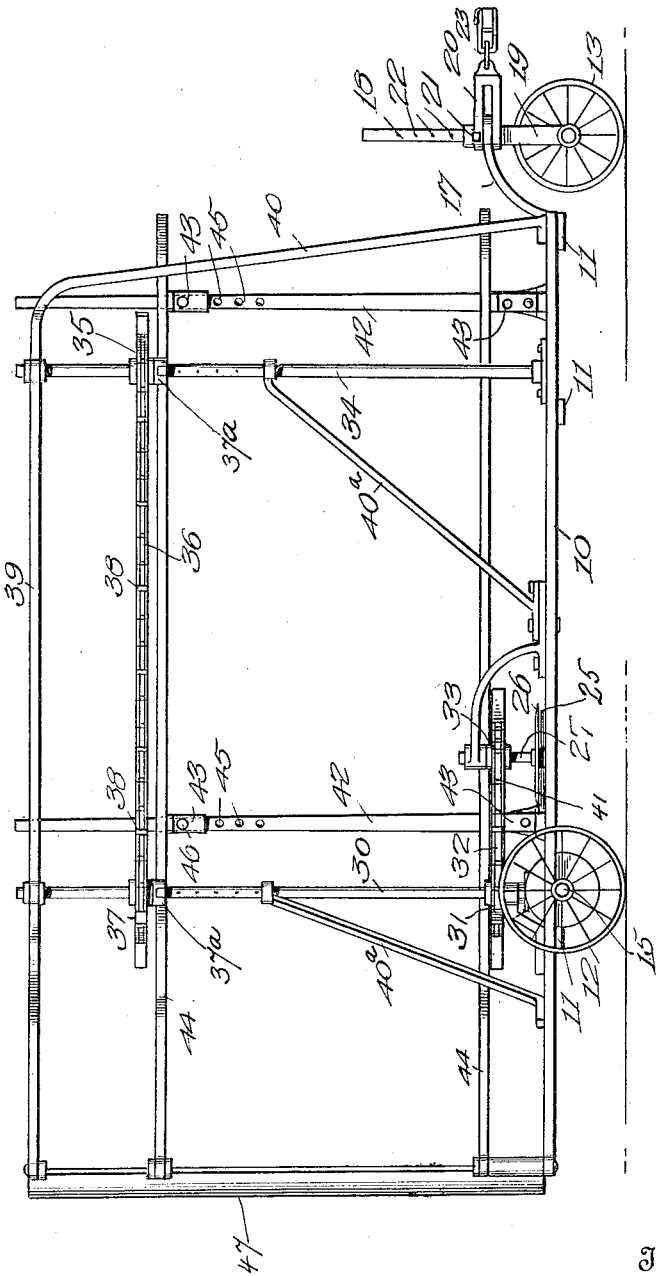

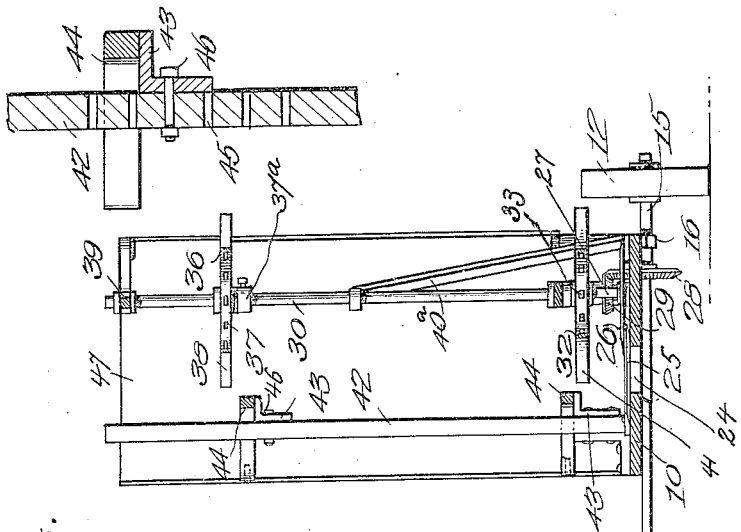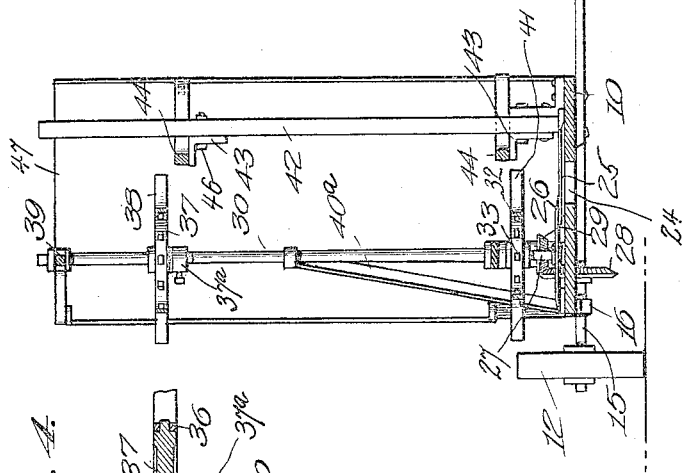

JAMES H. GROVE, OF SHAWNEE, OKLAHOMA.

STALK-CUTTER.

1,134,451. Specification of Letters Patent. Patented Apr. 6, 1915.

Application filed May 8, 1914. Serial No. 837,302.

*To all whom it may concern:*

Be it known that I, JAMES H. GROVE, a citizen of the United States, residing at Shawnee, in the county of Pottawatomie and State of Oklahoma, have invented certain new and useful Improvements in Stalk-Cutters, of which the following is a specification.

This invention relates to machines for harvesting corn, cane and other stalk crops, and its object is to provide a simple and efficient machine of this kind which cuts two rows of stalks at one time, and which can be easily managed by one person.

The invention also has for its object to provide a machine of the character stated which is adjustable to stalks of different heights.

These objects are attained by means of a novel combination and arrangement of parts to be hereinafter described and claimed, and in order that the invention may be better understood, reference is had to the accompanying drawings, in which—

Figure 1 is a plan view of the machine; Fig. 2 is a side elevation thereof; Fig. 3 is a transverse section on the line 3—3 of Fig. 1; Fig. 4 is a sectional detail showing the means for effecting vertical adjustment of one of the stalk conveyers, and Fig. 5 is a sectional detail showing the means for effecting vertical adjustment of one of the guard rails.

Referring specifically to the drawings, the main frame of the machine comprises two laterally spaced platforms 10 connected by cross-bars 11 and mounted at the rear on wheels 12 and at the front on a single wheel 13. The cross-bars adjustably connect the platforms so that they may be set different distances apart according to the distance between the rows of stalks to be harvested. To effect this adjustment of the platforms, the cross-bars have series of apertures 14 for the bolts or other fastenings which connect said cross-bars to the platforms. The axle 15 of the wheels 12 is journaled in bearings 16 mounted on the under side of the platforms, said wheels being fast on the axle, so that when the machine is in motion the axle turns and drives the cutting and other mechanism to be presently described. The front cross-bar 11 supports a forwardly extending bracket 17 in which is swiveled the stem 18 of a fork 19 carrying the wheel 13, which latter serves as a steering wheel. A clevis 20 straddles the bracket 17 and has apertures through which the stem 18 passes. The stem and the clevis are fastened together by a bolt or pin 21 passing therethrough, the stem having a series of apertures 22 for the pin so that the stem may be raised or lowered to vary the distance of the platforms 10 from the ground and thus adjust the height of the cutting mechanism. Suitable draft appliances 23 are carried by the clevis.

Each platform 10 carries a cutting mechanism and associate parts, and as they are alike, a description of one suffices for both. As shown in Fig. 1, the platform has a longitudinal slot or passage-way 24 along which the stalks to be cut pass, said slot extending rearward from the front end of the platform, and having its forward or entrance end flared to facilitate the entrance of the stalks. Extending obliquely across the rear end of the slot is a horizontal, stationary cutting blade 25, the cutting edge of which faces the forward end of the slot. By reason of the oblique position of the cutter, it will be evident that when the machine is traveling forward the stalks, upon reaching the cutter, are severed with a draw cut. Coöperating with the stationary cutter 25 is a rotary cutter 26 in the shape of a disk having a sharp edge, said disk being horizontal and set close to the stationary cutter to overlap the rear portion thereof, as clearly shown in Fig. 1. The cutter 26 is mounted on a vertical shaft 27 supported in suitable bearings carried by the platform.

On the drive axle 15 is a bevel gear 28 which is in mesh with a similar gear 29 fast on a vertical shaft 30. A sprocket-wheel 31 on the shaft 30, connected by a chain 32 to a sprocket-wheel 33 on the shaft 27, provides a driving connection for the cutter 26.

The forward end of the platform, on the same side of the slot 24 as the shaft 30, supports a vertical shaft 34 having near the top a sprocket-wheel 35 which is connected by a chain 36 to a sprocket-wheel 37 on the shaft 30. The chain is located some distance above the cutting mechanism and is armed with outstanding fingers 38 which extend over into the plane of the slot and engage the top of the stalks for conveying the same rearward to the cutting mechanism.

The sprocket-wheels 35 and 37 are adjustable on their shafts so that they may be elevated or lowered to adjust the conveyer chain 36 to different heights. This adjustment of the sprocket-wheels may be effected by changing the position of set collars 37ª which support the same on the shafts.

The upper ends of the shafts 30 and 34 are connected by a railing 39 which extends down in front to the forward end of the platform, as indicated at 40. The rear end of the railing terminates at the corresponding end of the platform. The shafts are also held up by braces 40ª rising from the platform. The chain 32 is also armed with outstanding fingers 41 for conveying the cut stalks to the rear end of the platform 10. This chain is located close to the cutters 25 and 26 and the fingers thereof engage the butt ends of the stalks. The conveyer chain 36 extends rearward as far as the conveyer chain 32 so that its fingers 38 may engage the top of the stalks after they are cut.

On the side of the slot 24 opposite from that side where the hereinbefore described cutting and conveying mechanism is located, are mounted front and rear posts 42, the same being supported on the platform 10 in any suitable manner and rising therefrom to the same height as the shafts 30 and 34. These posts carry brackets 43 which project in the direction of the slot and support top and bottom rails 44 extending throughout the entire length of the platform. These rails serve as guards to prevent the stalks from slipping away from the conveyer chains 32 and 36. The top rail is adjustable as to height by shifting its supporting brackets 43 up or down on the posts 42, the latter having series of holes 45 to receive the bolts 46 which secure the brackets to the posts.

The rear ends of the rails 39 and 44 spread so as to leave sufficient space on the rear end of the platform to accommodate the stalks, the latter being carried to this portion of the platform on which they accumulate. When sufficient stalks have thus accumulated, they are removed. The rear end of the platform on which the stalks gather has a gate 47 held closed by a latch 48. This gate is kept closed while the stalks are gathering on the platform, and upon swinging the gate open, the stalks may be removed.

I claim:

1. A stalk-cutter comprising a wheel-supported platform having a stalk passageway, front, rear and intermediate vertical shafts rising from the platform on one side of the passage-way, guard rails carried by the platform on the other side of the passage-way, a cutter carried by the intermediate shaft, sprocket-wheels on the front and the rear shafts at the top thereof, the rear shaft being located to the rear of the cutter, an endless chain connecting the sprocket-wheels and having outstanding conveyer fingers, sprocket-wheels on the rear and the intermediate shafts, an endless chain connecting the last-mentioned sprocket-wheels, said sprocket-wheels being below the first-mentioned sprocket-wheels, and having outstanding conveyer fingers and a driving connection for one of the shafts.

2. A stalk-cutter comprising a wheel-supported platform having a stalk passage-way, front, rear and intermediate vertical shafts rising from the platform on one side of the passage-way, guard rails carried by the platform on the other side of the passage-way, a cutter carried by the intermediate shaft, sprocket-wheels adjustably mounted on the front and the rear shafts at the top thereof, the rear shaft being located to the rear of the cutter, a stalk-conveyer chain connecting the sprocket-wheels, sprocket-wheels on the rear and the intermediate shafts, a stalk-conveyer chain connecting the last-mentioned sprocket-wheels, said sprocket-wheels being below the first-mentioned sprocket-wheels, and a driving connection for one of the shafts.

3. A stalk-cutter comprising a wheel-supported platform having a stalk passage-way, front, rear and intermediate vertical shafts rising from the platform on one side of the passage-way, a cutter carried by the intermediate shaft posts rising from the platform on the other side of the passage-way, top and bottom guard rails carried by the posts, the top guard rail being adjustable vertically, sprocket-wheels carried by the front and the rear shafts at the top thereof and adjustable vertically thereon, the rear shaft being located to the rear of the cutter, a stalk-conveyer chain connecting the sprocket-wheels, sprocket-wheels on the rear and the intermediate shafts, a stalk-conveyer chain connecting the last-mentioned sprocket-wheels, said sprocket-wheels being below the first-mentioned sprocket-wheels, and a driving connection for one of the shafts.

4. A stalk-cutter comprising a wheel-supported platform having a stalk passage-way, front, rear and intermediate vertical shafts rising from the platform on one side of the passage-way, a cutter carried by the intermediate shaft posts rising from the platform on the other side of the passage-way, top and bottom guard rails carried by the posts, a guard rail connecting the front and rear shafts, said guard rail and the first-mentioned guard rails terminating to the rear of the cutter and spreading thereat to form a stalk holder, a gate connecting the rear ends of the respective guard rails, sprocket-wheels on the front and the rear shafts at the top thereof, the rear shaft being located to the rear of the cutter, an endless chain connecting the sprocket-wheels, and having outstanding conveyer fingers, sprocket-wheels on the rear and the intermediate shafts, an endless chain connecting the last-mentioned sprocket-wheels, said sprocket-wheels being below the first-mentioned sprocket-wheels, and having outstanding conveyer fingers and a driving connection for one of the shafts.

In testimony whereof I affix my signature in presence of two witnesses.

JAMES H. GROVE.

Witnesses:
EARL J. THOMAS,
EFFIE J. THOMAS.

Copies of this patent may be obtained for five cents each, by addressing the "Commissioner of Patents, Washington, D. C."